W. F. CURTIS.
Machine for Jointing and Dressing the Teeth of Circular-Saws.

No. 222,776. Patented Dec. 23, 1879.

Witnesses:

Inventor:
William F. Curtis
per Edw. W. Donn
Attorney

UNITED STATES PATENT OFFICE.

WILLIAM F. CURTIS, OF ERVING, MASSACHUSETTS.

IMPROVEMENT IN MACHINES FOR JOINTING AND DRESSING THE TEETH OF CIRCULAR SAWS.

Specification forming part of Letters Patent No. 222,776, dated December 23, 1879; application filed July 28, 1879.

*To all whom it may concern:*

Be it known that I, WILLIAM F. CURTIS, of Erving, in the county of Franklin and Commonwealth of Massachusetts, have invented a new and useful Improvement in Machines for Jointing and Dressing the Teeth of Circular Saws, of which the following, with the accompanying drawings, is a true and full specification.

Manufacturers of circular saws and all who use them are fully aware that the work of dressing and trimming the teeth of such saws, after they have been gummed or filed, is difficult and tedious, and requires, to a considerable degree, skilled labor, as the points of the teeth must be of the same length; and that the radius from the point of each tooth to the center of the saw must be the same; and also that the teeth of the saw to the extreme points, when set, must all be in exactly the same vertical plane to cut with steadiness and truth.

If each successive tooth does not follow the preceding one in an exact line the cut will be irregular and "wabbling," as it is termed. These operations of trimming and dressing saw-teeth have usually been performed by hand-filing, and upon one tooth at a time, while the saw is stationary, or perhaps turned by hand, and sometimes removed from its bearings and put in another machine for the purpose. I purpose to do this at once, better, more accurately, and in much less time than has ever before been done, by the application of my devices, and also while the saw is running, without the necessity of taking it out of its bearings.

Figure 1:
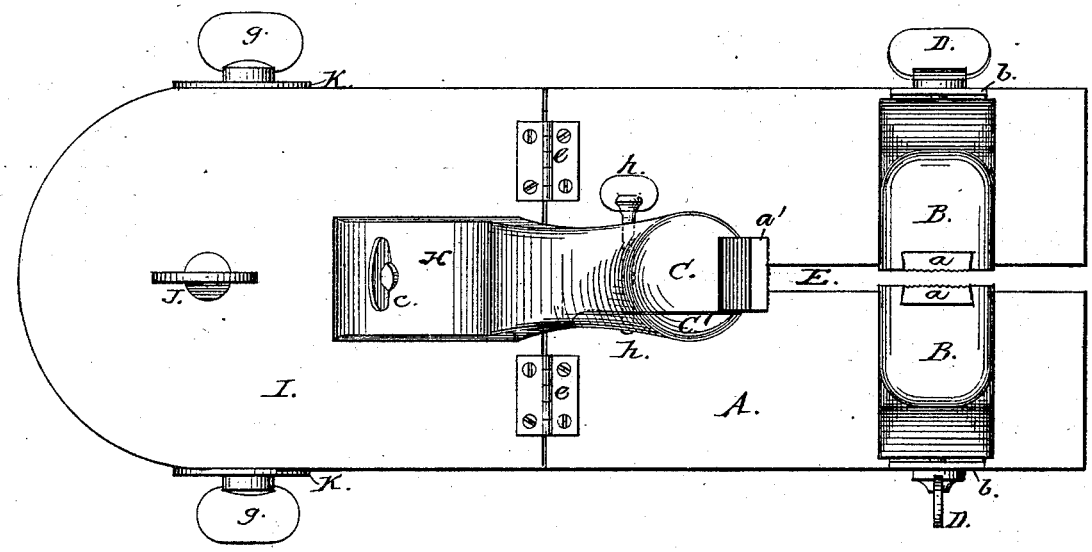
Figure 2:
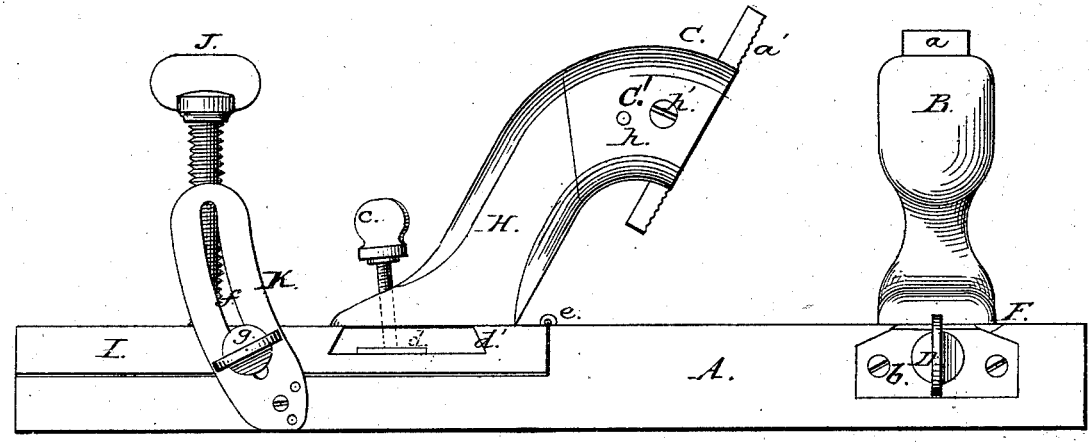

In the accompanying drawings, Figure 1 represents a plan view of my device. Fig. 2 is a side view of the same.

A is a bed-plate, upon which are secured the holders B for the files $a$, which dress the saw-teeth. This bed-plate has a slot, E, half its length, wide enough to admit a saw of any thickness.

The holders B B for the files $a$ stand upon the bed-plate, one on each side of the slot in which the saw is to run. Each holder is let into a channel or groove, F, which is of a dovetail form, and is cut transversely across the said bed-plate, near the front end. The bases of the holders B B are dovetailed, to correspond to the transverse groove in which said holders set and move. Each holder is caused to move laterally in groove F by a set-screw, D, fastened into a plate, $b$, secured by screws to the bed-plate. By means of said holders, actuated by the set-screws, the files $a$ may be adjusted to suit the thickness of the saw to be dressed.

In the upper face of each of these holders is a dovetailed slot running vertically, in which the files for dressing or trimming the saw-teeth are placed, and which remain fixed with no other fastening.

The files used are ordinary flat files of such cut as may be desirable, and are calculated to fit in the dovetailed-shaped slots in the holders B.

On a block, I, hinged to the bed-plate A, is an arm, H, which rises obliquely from its base and terminates with a head or clamp, C, adapted to hold a file, $a'$, for jointing the saw-teeth. This arm H, at its base, is dovetailed to fit in a corresponding groove, $d'$, formed in the block I, and in this groove said arm is adjustable laterally, and may be clamped at any point by a thumb-screw, $c$, which passes through the base of the said arm H into a plate, $d$, which rests upon the bottom surface of the groove $d'$.

The block I has a movement about the hinges $e$, which form its axis, to regulate the inclination of the arm H. A screw, J, which passes through the block I, serves to elevate or depress said block to any inclination to suit the diameter of the saw being operated upon by the file in the arm H.

The arm H is provided with a head, C, having an inclined face, which is recessed to receive a rectangular file, $a'$. Said file is clamped by a plate, C', which serves the purpose of a lever, as will be described hereinafter. This plate C' is secured to the head C, near its face, by a screw, $h'$, and when pressed against by the thumb-screw $h$, which passes through said head from the opposite side, the said plate, being controlled by the screw $h'$, which acts as a fulcrum, impinges upon the edge of the file held in the recess provided for it, and clamps the said file to its place.

Arcs K, having slots $f$ formed in them, are fixed to the bed-plate A, which arcs, together with the screws $g$, serve to hold said block and the arm H, with its file, to a suitable inclination.

The operation of the machine is as follows: The saw being hung in its position for work, the bed-plate of my machine is brought up to it, so that the saw is entered into the slot far enough for the files to act upon it. The file in the clamp C is brought carefully forward to the revolving saw till it touches and grinds off the point of each projecting tooth, being gradually advanced by the screw J till all the teeth are brought to exactly the same radial line from the center of the saw. The files in the holders B B, on each side of the saw, are then adjusted so as to barely touch the sides of the teeth as they revolve, and by a suitable adjustment of each, by the set-screws before described, all the teeth of the saw are dressed to precisely the same width and line. Either of these operations may be done first, and it will be seen that they can be done quicker and with more exactness by my machine than by any simple manual labor.

What I claim in a machine for dressing and jointing circular saws is—

1. The combination of the bed-plate A, block I, hinged thereto and provided with the dovetailed transverse groove, the slotted arcs K, screws $g$ and J, the inclined arm H, with a rabbeted head to receive the file, clamp-lever C′, having fulcrum-screw $h'$, and thumb-screw $h$, all arranged as and for the purpose set forth.

2. Holders B B, provided with dovetailed grooves in their faces to receive the files $a$, adjustment-screws D, secured in plates $b$, and bed-plate A, provided with a transverse dovetailed groove, F, in combination with block I, hinged to the bed-plate, slotted arcs K, clamping-screws $g$, elevating-screw J, and inclined arm H, all arranged substantially as and for the purpose specified.

WILLIAM F. CURTIS.

Witnesses:
JAMES S. GRINNELL,
LEWIS MERRIAM.